March 2, 1937.    H. J. CARSON    2,072,357
APPARATUS FOR PRODUCING WATER GAS
Original Filed June 17, 1927
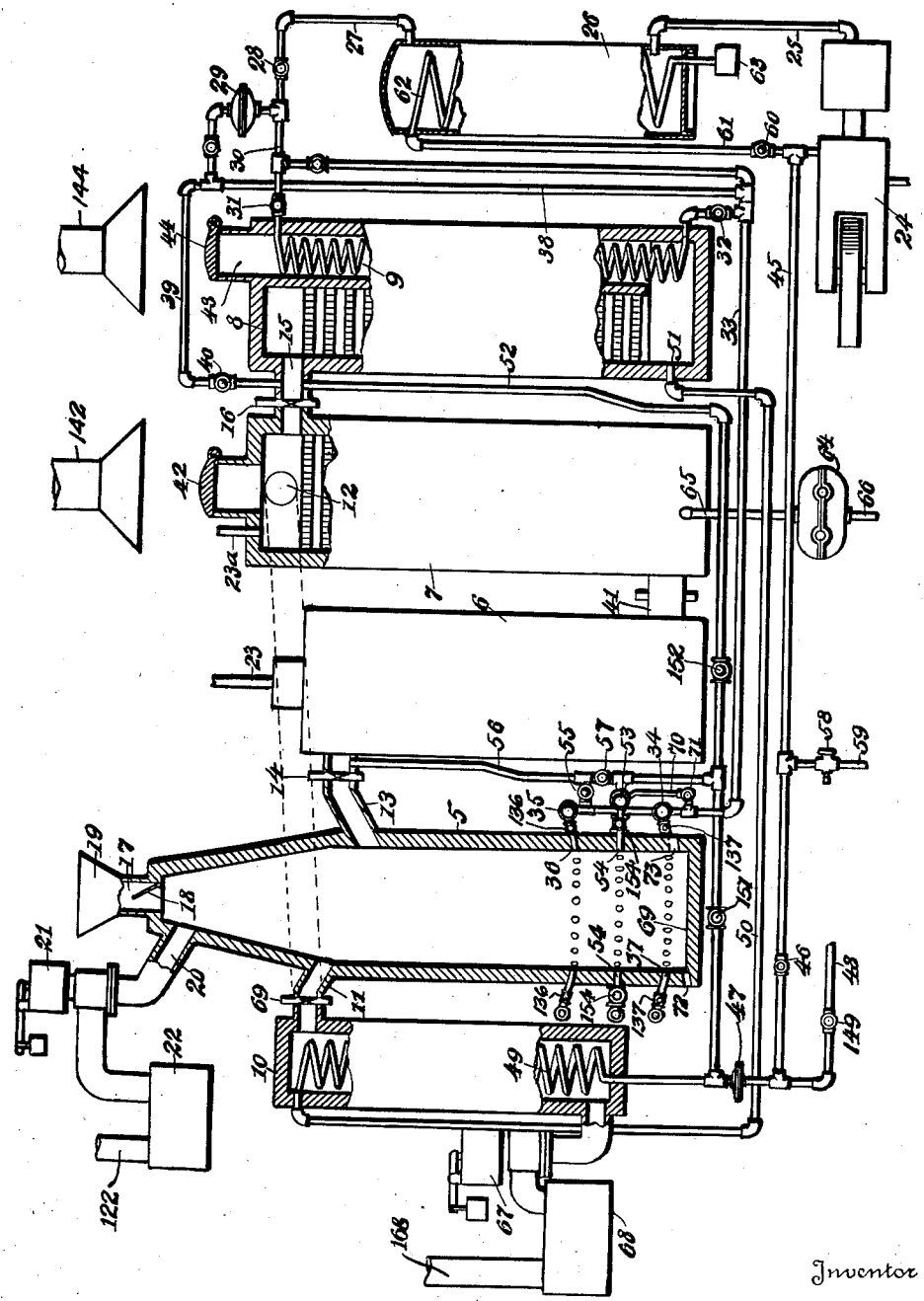
Inventor
Hiram J. Carson
By Joseph Harris
His Attorney Patented Mar. 2, 1937

2,072,357

UNITED STATES PATENT OFFICE 2,072,357

APPARATUS FOR PRODUCING WATER GAS

Hiram J. Carson, Omaha, Nebr.

Original application June 17, 1927, Serial No. 199,572. Divided and this application March 14, 1934, Serial No. 715,400

8 Claims. (Cl. 48—73)

This invention relates to improvements in apparatus for producing water gas and the present application is a division of co-pending application 199,572, filed June 17, 1927, now Patent 1,952,654 for improvement in Process of making blue and carburetted water gas.

As is well known, in the usual operation of a water gas set, the time is roughly divided into two periods: the air blasting or heating up period, and the steam running or water gas making period. The heat developed during the blasting period, and stored in the generator fuel bed, is available in the gas making period for decomposing the steam admitted to the generator.

In practice, at the beginning of a running period, the decomposition of steam is rapid and nearly complete for a short period, but falls off rapidly thereafter, owing to the slower decomposition as the generator fuel bed temperature falls.

It has been stated that very little steam is decomposed at temperatures below 1000 deg. C. (1832 deg. F.) whereas the rate of decomposition is estimated to double with every rise of 100 deg. C. in temperature and such decomposition is very rapid at temperatures of 1200 deg. C. and above. While the temperature in the steam decomposition zone in a generator fuel bed may vary at different levels in that zone, it follows that the minimum practical temperature of its highest temperature portion is 1000° C. and the heat in the fuel bed useful for steam decomposition is the heat stored above that temperature.

In present operation insufficient account is taken of the foregoing facts. Steam admitted to the generator is actively decomposed at first, but decomposition is soon arrested as the fuel temperature is lowered by the cooling action of such steam decomposition. As the temperature drops, less and less of the steam admitted is decomposed, and this increasing excess of undecomposed steam has the harmful effect of further cooling the fuel bed with no useful result.

To restore heat storage to the fuel bed at proper temperature levels after such cooling, fuel, air and time are necessary, and as the fuel bed must be heated first to the temperature where steam decomposition begins at an effective rate and as the useful heat storage is that above 1000 deg. C. the blasting and heating to bring the fuel bed temperature up to 1000 deg. C. may be avoided by keeping a minimum temperature in the steam decomposition zone of about 1000 deg. C.

In present water gas practice, operation is continued until the accumulation of ash and clinker in the base of the generator prevents further operation in a practicable manner. Gasmaking is then discontinued to permit the removal of ash and clinker after which operation is resumed. Also, in present water gas practice, the air for blasting is supplied at low pressures and fan type air blowers run only during the air blasting period.

One object of this invention is to provide improvements in a water gas generating set such that certain economies and efficiencies are obtained as compared with present practice of producing water gas.

Another object of the invention is to provide improvements wherein preheated air for blasting may be employed, the preheated air being introduced uniformly to the fuel bed of the gas generator under sufficiently high pressure to obtain the desired penetration thereof and under control or regulation at different zones or levels to the end that a deeper bed of incandescent fuel may be created than has heretofore been economically attainable.

Another object of the invention is to provide improved means wherein preferably superheated steam may be employed during the gas-making period and the steam also supplied to the fuel bed uniformly and under control and in such manner as to prevent or minimize cooling of the bottom layer or zone of the fuel bed to thus permit ready ignition of the fuel at the beginning of a succeeding air blasting period.

Still another object of the invention is to provide an improved generator having a refractory bottom so that fluxing materials may be introduced as required and the lower layer or zone of the fuel bed always maintained sufficiently hot that ash and clinker forming materials may be drawn off in the form of liquid slag, to the end that the operation may be continuous or substantially continuous and free of the arduous labor and loss of time occurring in water gas generators heretofore employed.

A more specific object of the invention is to provide an improved generator so arranged that the air blasting of the fuel bed may be accomplished by introducing the air, preferably preheated, to the lower portions of the column of fuel at vertically spaced or separated levels, either simultaneously or successively and selectively and the steam, preferably superheated, introduced uniformly into the bed of fuel during the gas making period, at a level or point above the lowermost air blast level, whereby the temperature in the lowermost layer or zone of the fuel bed may be maintained to permit the drawing off of ash and clinker-forming material in the form of liquid slag.

Other objects of the invention will more clearly appear from the description and claims hereinafter following.

In the drawing forming a part of this specification, the figure illustrates, more or less conventionally, partly in elevation and partly in vertical section, a carburetted water gas plant having the several improvements incorporated therein.

In the type of gas plant shown, four principal units are represented by the water gas generator 5, and adjacent carburetter 6, a gas superheater 7 and a steam superheater 8, the latter being shown with an air preheater 9 installed therein. A supplemental steam superheater 10 is shown connected to gas outlet 11 on the generator 5, which may be connected to gas outlet 12 when desired, as shown by dotted lines.

A passageway 13 between the generator and carburetter is adapted to be opened and closed by a valve 14 (shown conventionally), and a similar passageway 15 between the superheaters 7 and 8 is supplied with a similar valve 16.

A generator is shown with a tapered and extended upper end with fuel supply opening 17 having a suitable closing gate or valve 18 and a suitable charging device 19. Coal gas offtake 20 leads through regulating valve 21 to gas wash box or seal 22, which has an outlet 122.

As shown in the drawing, the generator has omitted therefrom the usual bottom grate heretofore employed and, instead, the bottom of the generator is made as a closed hearth 69 with an opening at 72 to allow for the out flow of the residual slag to which the ash is reduced by the high temperature of forced combustion. Another opening at 73 is employed for the introduction of a flux, both said openings 72 and 73 being normally sealed with any suitable substance such as fire clay. Fluxing material, such as limestone, soda ash, fluorspar or iron ore, may be introduced into the generator with the fuel, if desired.

Pipes 23 and 23a supply oil to the checker brick chambers for gasification.

Air compressor 24 supplies air for blasting through pipe 25, air receiver 26, pipe 27, valve 28, pressure regulating valve 29, pipe 30, valve 31, air preheater shown as coil 9, valve 32 and pipe 33, to the distributing headers of bustle pipes 34 and 35 through tuyère pipes 36 and 37 to the generator fuel bed and to the carburetter for secondary air through valve 55 and pipe 56, valve 57 being closed meanwhile. Valves 136 and 137 are shown in the tuyère pipes at each level 36 and 37 respectively and indicate one method of adjusting the flow at each level, as desired. As will be obvious to those skilled in the art, one valve in the inlet to bustle pipe 34 and one valve in the inlet to bustle pipe 35 could be used to control the air supply to the bustle and tuyère pipes at the respective levels and thereby eliminate the necessity for a valve in each tuyère pipe.

The air blast gases pass from the generator through passage 13, valve 14, down through carburetter 6, through open connecting passage 41, up through gas superheater 7, (stack valve 42 for stack 142 being closed) through valve 16 and passage 15 down through steam superheater 8 and up through passage 43 around air preheater 9, through which blasting air is simultaneously passing and out to a stack 144 through stack valve 44.

During the water gas-making period, steam is admitted to the superheater 10 through coil 49 therein, such steam preferably being exhaust steam from the compressor 24 passed through pipe 45 and control valve 46, and pressure regulator 47 although steam may be admitted from any other source of steam supply through pipe 48, control valve 149 and pressure regulator 47, the valve 46 in this case being closed or, if the conditions require, steam may be supplied from both of said sources simultaneously, the pressure being suitably regulated. The steam in passing through coil 49, is superheated by the gas passing downwardly therearound and which is delivered from either offtake 11 or 12 and the superheated steam is then conducted through the pipe 50 to the base of steam superheater at 51, thence passes upwardly over the checker brick therein where it is further superheated and thereafter conducted through pipe 52 to the steam distributing header or bustle pipe 53 and finally delivered through the tuyère pipes 54 into the fuel bed in the generator, the supply of steam through tuyère pipes 54 being controlled by valves 154. In lieu of the tuyère control valves 154, a single control valve 152 may be included in the pipe 52 between the superheater 8 and bustle pipe 53 and another valve 157 in the pipe between the pressure regulator 47 and bustle pipe 53. Steam may also be admitted through valve 57 and pipe 56 to the carburetter, as desired, valve 55 being closed meanwhile.

Pipe 59 with relief valve 58 leads any excess exhaust steam to the atmosphere or to other steam using equipment, and prevents back pressure on the compressor rising beyond any predetermined point.

Valve 60, pipe 61, coil 62, steam trap 63 represent means for preheating air in receiver 26 with exhaust steam, if desired, and drawing off condensed steam through trap 63.

Pump 64, connected by pipe 65 to the base of gas superheater 7, with oil sprayed in to top of the gas superheater through supply pipe 23a as well as through pipe 23 into the carburetter, is used to draw oil gases out of the carburetter and superheater chambers, valves 14, 16 and stack valve 42 being closed and opening 12 closed off. By regulating the rate of pumping by pump 64, the desired condition of reduced pressure for optimum conditions of oil gasification may be maintained in the carburetter and superheater, and the oil gases so formed may be delivered through pipe 66 to such farther point in the apparatus as is desired.

While the gasifying of oil is going on in these chambers, steam may be admitted to the top of the carburetter through valve 57 and pipe 56 and to the top of water gas superheater by opening valve 16 as desired and when oil is shut off, steam so admitted may be used to purge these chambers of oil gases.

The course of the air blast gases through the apparatus has been described. The potential heat in these gases is released through combustion with secondary air in the carburetter and tertiary air admitted to the checker brick steam superheater, as desired, and this released potential heat with the sensible heat in these gases is used to store heat in the carburetter, gas superheater, and checker brick steam superheater for gasifying oil admitted to the carburetter and gas superheater during the gas making period and, in the checker brick steam superheater, to superheat steam to the generator. The heat in the blast gases leaving the checker brick steam superheater is further utilized in preheating the air to the generator which is simultaneously passing through the air preheater shown as coil 9 before being discharged to the atmosphere through stack valve 44. The checker brick steam superheating and air preheating arrangement recover otherwise waste heat from the blast gases and return this recovered heat to the generator in the superheated steam and preheated air, thus effecting a substantial reduction in the amount of heat required from that stored in the generator fuel bed and in air and fuel consumed during blasting for a given amount of gas made. The use of the sensible heat in the newly made gas for giving the steam its initial superheat before entrance to the checker brick steam superheater permits a final higher degree of superheat, also a higher temperature of preheat in the air, as the blast gases pass through the air preheating chamber at higher temperatures because of the initial superheat in the steam and less cooling in the checker brick steam superheater.

During the gas making period, the superheated steam is delivered to the heated fuel bed in the generator through tuyère pipes 54 as previously described. The blue water gas resulting from the steam decomposition may all be taken through passage 13, carburetter 6, superheater 7, enriched by oil simultaneously vaporized in the carburetter in the usual way and through offtake 12 and supplemental steam superheater 10, superheating the steam simultaneously passing through coil 49 and thence through regulating valves 67 to wash box 68 and thence through outlet 168 to such other apparatus as may be desired.

It is, however, desired to use sensible heat in the newly made gas for passing through and carbonizing newly charged fuel, such as bituminous coal, in the upper portion of the generator. Accordingly, a portion of the newly made blue water gas may pass through the carburetter and superheater, as above described, and the remaining portion pass upwardly through the newly charged fuel, such as bituminous coal, and, mixed with coal gas, pass out through offtake 20. During the gas making period, with valves 14 and 16 closed, opening 12 closed, and stack valve 42 closed, and oil sprayed in through oil supply pipes 23 and 23a, and oil gas pump 64 drawing off oil gas, a portion or all of the gas newly made in the generator may pass through coal gas offtake 20 and any remaining portion may pass through opening 11, valve 69 to superheating chamber 10, and thence to tar batter 68, as previously described.

Under such operation, gas is drawn from three different points in the apparatus: coal gas and blue water gas through offtake 20; blue gas through offtake 11; and oil gas through pump 64. The gases from the three points may be used separately or mixed later, as described, but preferably after the coal gas drawn through offtake 20 has passed through necessary apparatus for recovering oils and byproducts usual with low temperature carbonization.

As coal gas will be given off from the newly charged coal in the upper part of the generator during both the air blasting and gas making periods, the regulating valve 21 in the coal gas offtake is designed to vary the valve opening during these two periods so that during the blasting period, little or no blast gas is drawn off with the coal gas.

The adjustment of regulating valve 21 and of similar valve 67 is so made that the desired flow of gas is obtained through offtakes 20 and 11, with oil pump 64 and oil spray pipe 23a used, or through offtakes 20 and 12, if oil pump 64 and oil spray pipe 23a are not used.

In making uncarburetted water gas or blue gas, the carburetter 6 and gas superheater 7, and valve 14, may be dispensed with, and the passage 13 connected directly to valve 16, and passage 15 leading into checker brick steam superheater.

For making blue water gas the apparatus modified as above is used as in carburetted water gas practice.

During the gas making period, air may be admitted in restricted amount through the air tuyères at the lowest level at any rate desired by adjusting the valves 137. The combustion of such air generates heat in the generator while steam decomposition is going on, and results in the formation of a limited amount of producer gas of a varying heating value, depending on the amount of air so introduced.

When non-volatile or low volatile fuel as coke or anthracite coal is used in the generator, all or part of the blue water gas may be drawn off through offtake 20 with offtake 11 blanked off or offtake 20 may be blanked off and blue water gas drawn off through offtake 11 and passage 13, as desired.

With air supplied to the generator at two vertically spaced levels as at 36 and 37 and steam supplied at an intermediate level as at 54, the steam thus bypassing the underlying or lowermost layer of fuel, it is evident that such underlying fuel will remain at a relatively high temperature, and the temperature in the fuel opposite and just above the level of steam admission will be substantially lowered during the gas making period by the entering steam and the temperatures in the higher levels of generator fuel bed will be reduced less.

It is contemplated that steam will be admitted to the generator only so long as heat stored in the fuel bed is available above say 1800 deg. F. for steam decomposition.

During each air blasting period, the fuel just above the bottom surface will be of sufficiently high temperature, 1100° centigrade or more, for maintaining the ash and clinker-forming material in liquid form and will also be of slight depth. When the air is admitted at the lower level, it will, with the fuel, form carbon dioxide mostly and rapidly raise the temperature of the lower portion of the fuel bed. During the gas making period, the temperatures will decrease toward the ash liquefying temperature and may possibly fall slightly therebelow. Air admitted at the higher level, will, with the fuel, form carbon dioxide mostly at first, thus further raising temperatures and increasing the thickness of the high temperature zones in the lower portion of the fuel bed, which thickness may be further increased by similar blasting at higher levels.

As the temperatures in the fuel bed are raised above about 1000° C. throughout and the thickness of fuel bed at and above 1000° C. is increased in depth, the tendency for the carbon dioxide from the primary combustion to be decomposed into carbon monoxide with absorption of heat from the fuel bed will be increased, and the efficiency of blasting or heat storing in generator will be decreased.

By maintaining the velocity of the blast air and gases through the fuel bed at the highest practicable maximum, and reducing or discontinuing air introduction at the lower level as temperatures in the bottom zone of fuel bed rise to the desired point, all or any desired portion of the blasting air may then be admitted at the higher level. By this means the time of contact of air and blast gases with the hot fuel will be reduced and by maintaining the air supply to fuel bed at the higher level in relatively large volume, optimum blasting or heat storing conditions will be attained and the greatest practicable portion of the carbon consumed from fuel will, with the air, form carbon dioxide, liberating the maximum amount of heat, raising the fuel bed temperature rapidly to the desired point so blasting may be discontinued at this level and discontinued at higher levels when desired. In the manufacture of carburetted water gas and blue water gas, any carbon monoxide formed in the generator during air blasting may be burned to carbon dioxide by the further admission of air to the carburetter and/or checker brick steam superheater, and both sensible and potential heat in the blast gases leaving the generator usefully used to the most practicable extent for superheating steam and preheating air.

Conditions for the forming of carbon monoxide during the air blasting period are most favorable at the end of the air blasting period. Should heat during the blasting period be required in the upper portion of the generator for carbonizing coal, optimum conditions for the production of carbon monoxide may be maintained during the latter portion of this period and the blast gas or producer gas so formed drawn off with coal gas simultaneously produced, through the coal gas offtake.

It is well known that the preheating of air for combustion makes possible increased temperatures from such combustion and combustion is more nearly complete. This increases the efficiency and makes higher combustion rates possible. Particularly is this true in a water gas generator where the heat for decomposition of the steam is supplied at relatively high temperature levels.

The relatively large volumes of air at low pressure now used in current gas making practice and the intermittent nature of the operation, together with the large piping necessary for transmitting air at low pressures has made it difficult if not impracticable to preheat air because of the bulky and expensive equipment required.

The use of air at sufficiently high pressures for the desired penetration of the generator fuel bed, permits a reduction in the size and cost of the piping, valves and insulation required. When the air is first compressed to relatively high pressures, the large air receiver permits relatively continuous operation so that part or all of its exhaust steam is available for gas making.

It is evident that, by superheating the steam for introduction to the generator, less heat will be required from the heat storage in the generator fuel bed for its decomposition and more nearly optimum conditions for the production of blue water gas and complete steam decomposition will be so obtained.

It is also evident that with a solid bottom in the generator and means for drawing off the ash and foreign matter in the form of molten or liquid slag, the present limitations on temperatures in water gas generators are largely removed and a more nearly clean fuel bed with a consequent more uniform porosity of the fuel bed maintained.

The use of relatively small tuyère pipes spaced circumferentially around the generator for air and steam admission to the generator fuel bed, insures a uniform distribution of each to the different parts of the fuel bed.

In carbonization of coal, it is well known that coal gas given off at low temperatures has a high heating value and may be processed for the recovery of valuable by-products.

Low temperature conditions are obtained in the carbonization zone in the upper portion of the generator described and a high heating value gas which, after processing for by-products, may be mixed with blue water gas and thus decrease the need for enrichment by oil gases.

The maintenance of reduced pressures in the carburetter and gas superheater independently of generator pressures during the oil gasifying period provides nearly optimum conditions for the production of stable oil gases, and pressures and velocities in the generator may be suited to optimum conditions for the production of gas in the generator.

Under conditions favoring the alternate admission of air and steam at one level, the air supply is connected to the steam header or bustle by a pipe 70 and valve 71.

As will be obvious to those skilled in the art, various changes and modifications may be made in the construction disclosed and in the manipulative features without departing from the spirit of the invention. All such changes and modifications are contemplated that come within the scope of the claims appended hereto.

What is claimed is:

1. In apparatus for generating water gas, a liquid slagging water gas generator comprising a vertical shell having a solid refractory bottom hearth, means for discharging liquid slag, and gas outlet means above the usual incandescent zone of the fuel column; sets of air blasting means located, one at a level adjacent and above said bottom hearth and another at a substantially higher level; steam inlet means located at a level intermediate said sets of air blasting means and at such level that, when the steam is admitted alternately of the air through said air blasting means, the temperature of the lowermost layer of the column of fuel may be maintained for removal of the ash and clinker forming material in the form of liquid slag, all of said air blasting means and steam inlet means being located below said gas outlet; a source of air connected to said sets of air blasting means; a source of steam connected to said steam inlet means; and independently operable means for shutting off and controllably adjusting the admission of the air and steam alternately through said air blasting and steam inlet means.

2. In apparatus for manufacturing water gas, a generator forming a vertical chamber for a column of fuel and in which the gas is generated in approximately the lower half thereof, said generator having a gas offtake above the gas generating zone, means for selectively feeding blast air to the fuel at vertically spaced levels, means for feeding steam to the fuel at a level intermediate the air feed levels, all of said air and steam feeding means being located in the lower half of the generator below said offtake, an air supply source connected to said air feeding means, and a steam supply source connected to said steam feeding means.

3. In apparatus for the manufacture of carburetted water gas, a generator, a carburetter, a regenerator and an air preheater of the recuperative type, all operatively connected in series; a plurality of independently controllable means for introducing preheated blast air to the fuel in the generator at vertically spaced levels and with the lowermost of said means near the bottom of the generator, all of said means being operatively connected with said preheater for the preheating of the air in the latter; means for introducing superheated steam for the gas runs into the generator at a level above the lowermost air blast level means and below the uppermost air blast level means, said steam introducing means being in operative communication with the regenerator for the superheating of the steam therein; means for supplying air for secondary combustion of the blast gases passing from the generator to the carburetter, the generator being provided with an offtake for the blast gases located approximately at the bottom of the green fuel portion of the fuel column in the generator, said generator being provided with an additional offtake adjacent the top thereof, means for regulating the discharge of gases through said offtakes whereby during gas making runs, part of the generated water gas may be passed upwardly through the green fuel portion of the fuel column for distillation and the remainder passed through the first named offtake to the carburetter and carburetted in the latter, said generator being provided with means for discharging ash and clinker-forming material as liquid slag.

4. In apparatus for the manufacture of water gas, the combination with a generator and a regenerator operatively connected in series; means for introducing blasting air at vertically spaced levels into the generator in the lower half thereof and said generator being provided with means for discharging ash and clinker-forming material as liquid slag; means for supplying air for secondary combustion of the blast gases in the passage thereof to and through said regenerator; and means for introducing superheated steam into the lower half of the generator at a level above the lowermost air blast level, said means being in operative communication with the regenerator and the steam superheated in the latter.

5. In apparatus for generating water gas from solid fuel, a generator which comprises a vertical shell for maintaining a vertical column of fuel with substantially the lower half thereof incandescent and the remainder green fuel, said shell having a solid refractory bottom with means adjacent thereto for discharge of liquid slag, said shell having vertically separated upper and lower sets of air blasting tuyères in the wall thereof; means for injecting steam into the interior of the shell at a level intermediate said upper and lower sets of air blasting tuyères, all of said tuyères and said steam injecting means being located in the lowermost half of the shell and below the top of said normally incandescent portion of the fuel column, said shell being provided with a gas offtake located at a point above said uppermost set of air blasting tuyères, an air supply source connected to said air blasting tuyères and a steam supply source connected to said steam injecting means.

6. In apparatus for generating water gas from solid fuel, a generator which comprises a vertical shell for maintaining a vertical column of fuel with substantially the lower half thereof incandescent and the remainder green fuel, said shell having a solid refractory bottom with means adjacent thereto for discharge of liquid slag, said shell having vertically separated upper and lower sets of air blasting tuyères in the wall thereof; means for injecting steam into the interior of the shell at a level intermediate said upper and lower sets of air blasting tuyères, all of said tuyères and steam injecting means being located in the lowermost half of the shell and below the top of said normally incandescent portion of the fuel column, said shell being provided with offtakes, one located substantially at the top thereof and the other approximately midway between the top of the shell and said uppermost set of air blasting tuyères, and air and steam supply sources connected respectively to said sets of air blasting tuyères and the steam injecting means.

7. In apparatus for manufacturing water gas, a generator having a lower gas generating zone, a solid bottom hearth, a gas offtake, and means for removing liquid slag therefrom; air blast inlet means located above the hearth; steam inlet means disposed above said air blast inlet means; an additional air blast inlet means disposed above said steam inlet means; an air supply source connected to said air blast inlet means; and a steam supply source connected to said steam inlet means, all of said air and steam inlet means being located in the lower part of the generator and below said gas offtake.

8. In apparatus for the production of water gas, an upright shell having a slagging bottom and provided with means for the removal of ash and clinker forming material as liquid slag; an air supply source; selectively controllable means for introducing air operatively connected with said air supply source and located at vertically spaced levels above said slagging bottom of the shell; a steam supply source; and controllable means operatively connected with said steam supply source, located at a level above the lowermost air blast level for introducing up-run steam into the shell, said shell having also a gas offtake located above the highermost level of said air introducing means.

HIRAM J. CARSON.